June 25, 1940.  F. B. SCHMITT  2,205,495
BATTERY SERVICING KIT
Filed April 29, 1938
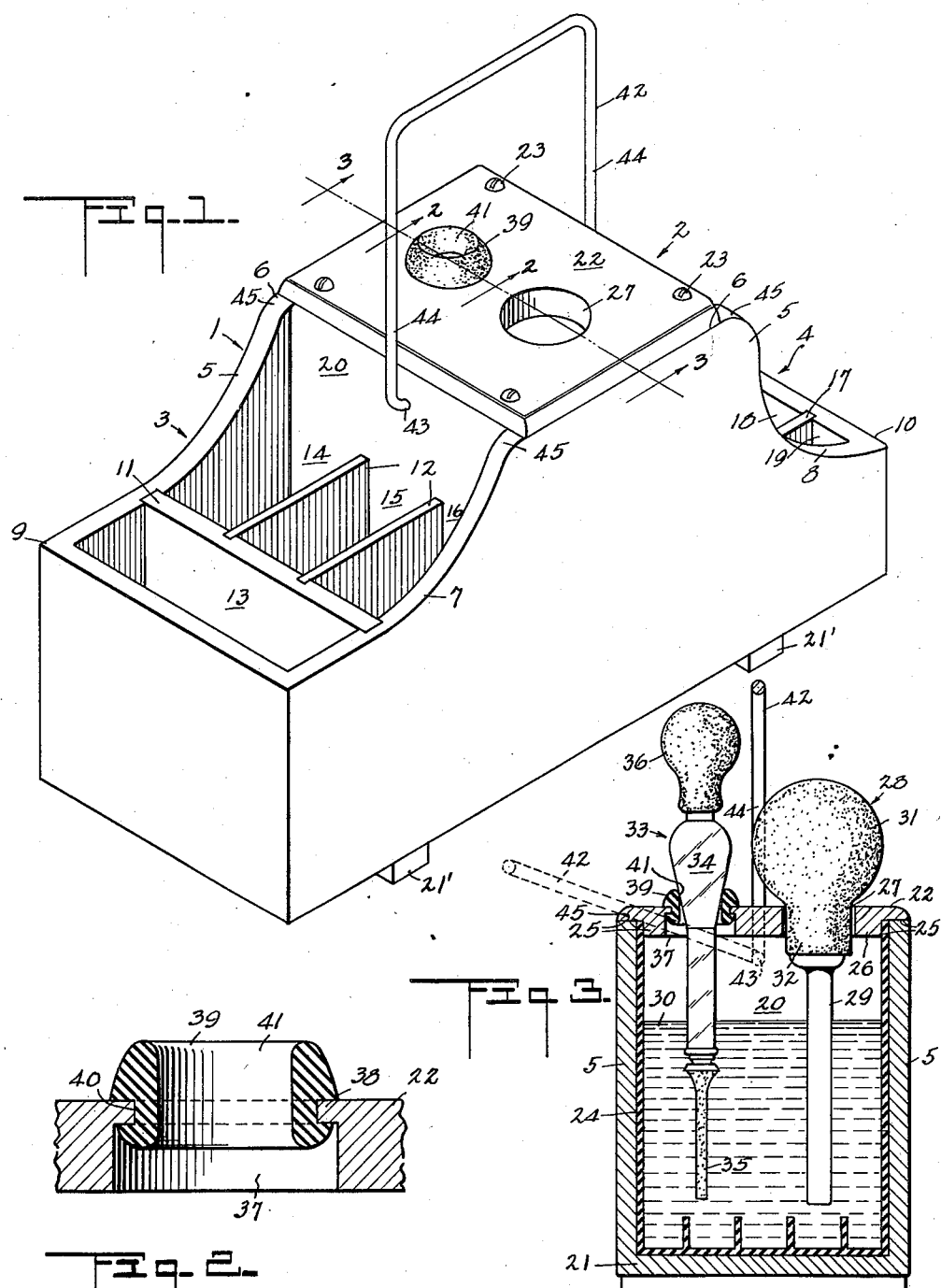
INVENTOR.
FRANK B. SCHMITT.
BY Schapp & Cole
ATTORNEYS.

Patented June 25, 1940

2,205,495

UNITED STATES PATENT OFFICE 2,205,495

BATTERY SERVICING KIT

Frank B. Schmitt, San Francisco, Calif.

Application April 29, 1938, Serial No. 205,130

6 Claims. (Cl. 206—16)

The present invention relates to improvements in battery servicing kits, and it consists of the combinations, constructions and arrangements hereinafter described and claimed.

It is proposed in the present invention to provide a kit in which the various tools and instruments necessary for servicing a storage battery may be accommodated, thus facilitating the work of the mechanic in servicing the battery.

It is further proposed to provide a battery servicing kit having a number of compartments, which are designed for the reception of different servicing tools and supplies required by the mechanic in checking and repairing a storage battery.

A still further object of my invention resides in the provision of a device of the character described that is compact, and which may be conveniently carried from place to place. It is proposed to include a supply of distilled water in the kit and also a hydrometer and a syringe, whereby water may be added to the battery and the specific gravity of the battery determined.

Other objects and advantages will appear as the specification proceeds and the novel features will be set forth in the appended claims.

For a better understanding of my invention reference should be had to the accompanying drawing, forming part of this application, in which:

Figure 1 is a perspective view of a battery servicing kit embodying my invention; and Figures 2 and 3 are transverse sectional views taken along the lines 2—2 and 3—3, respectively, of Figure 1.

While I have shown only the preferred form of my invention, it should be understood that various changes or modifications may be made within the scope of the annexed claims without departing from the spirit of the invention.

In carrying my invention into practice, I provide an elongated box-like structure 1, including a central compartment 2 and wing compartments 3 and 4, the central compartment being somewhat higher than the wing compartments.

It will be noted from Figure 1 that the sides 5 of the box-like structure are fashioned with flat marginal top sections 6 and curved sections 7 and 8, the latter sloping downwardly toward the end walls 9 and 10 of the box.

The wing compartment 3 has a transverse partition 11 and longitudinal partitions 12 arranged therein to define pockets 13, 14, 15 and 16. In actual use, I find that the pocket 13 is adapted for receiving a rubber apron which may be used by the mechanic, while the pockets 14 to 16, inclusive, may be used for various types of pliers, brushes and other battery tools.

In Figure 1 a partition 17 divides the wing compartment 4 into pockets 18 and 19, the former pocket being intended for holding a can of grease for use on battery terminals and the latter pocket for receiving record cards.

The central compartment 2 is defined by the sides 5, two parallel end walls 20, a bottom 21 (see Figure 3), and a cover 22, which is removably secured to the walls 20 by screws 23 or other suitable fastening means. Strips 21' may be fastened across the bottom 21 to serve as feet for the kit.

In servicing a storage battery it is particularly desirable to have a supply of distilled water on hand, and I have provided for this purpose a jar 24, preferably of hard rubber, that is accommodated in the central compartment 2 and the tops of the compartment and the jar are arranged in registry in the manner shown in Figure 3.

The cover 22 has a stepped edge 25 extending along the entire margin thereof, which defines a projection 26 snugly engaging with the inner walls of jars 24. The cover 22 is common to the central compartment 2 and to the jar 24 and the latter is held in place by the cover.

An aperture 27 is formed in the cover 22 for receiving a syringe 28. The tube 29 of the syringe projects downwardly into the distilled water 30, while the bulb 31 of the syringe is presented on the top of the cover. The reduced neck 32 of the syringe is accommodated in the aperture 27 and substantially closes the latter when the bulb rests on the cover.

It is also necessary to use a hydrometer when testing and servicing a battery, and such an instrument is illustrated at 33. The conventional hydrometer usually includes a downwardly-tapering hollow glass body 34, terminating at its lower end with a rubber tube 35 and a bulb 36 mounted at the top of the body 34.

In Figures 2 and 3 I show an aperture 37 that is reduced at its upper end to define an inwardly-extending flange 38. A yielding collar 39, preferably made of rubber, is disposed in the aperture 37 and has an external annular groove 40 yieldingly engaging with the flange 38. An opening 41 extends through the collar for allowing the hydrometer to be inserted thereinto until the body 34 of the hydrometer rests on the top inner edge of the collar in the manner disclosed in Figure 3. The collar 39 grips the hydrometer when the latter is pressed downwardly against the coljar, and this serves to hold the hydrometer in place.

A loop-shaped handle 42 has the ends 43 thereof swingably fastened to the two opposing walls 20 of the central compartment along the central vertical plane of the box-like structure 1. This construction allows the box to be carried from place to place and the two sections of the structure disposed on the opposite sides of the central vertical plane are substantially balanced beneath the handles.

It will be noted from Figure 3 that the handle 42 may be swung into a position to allow the cover 22 and the jar 24 to be withdrawn vertically from the central compartment 2. When the handle occupies the dotted line position shown in Figure 3, the sides 44 thereof rest upon portions 45 of the box sides 5 to limit downward movement of the handle.

The syringe 28 and the hydrometer 33 are disposed on opposite sides of the handle 42 when the latter is presented upright and the mechanic may lift the entire kit by means of the handle without interference by the syringe or the hydrometer. The handle may be swung into the dotted line position illustrated in Figure 3 without removing the syringe or the hydrometer.

Having thus described the various features of my battery servicing kit, the operation thereof may be readily understood. The kit is normally filled as follows: A rubber apron is stored in pocket 13, the necessary battery tools placed in pockets 14 to 16, inclusive, a can of grease disposed in pocket 18, a supply of record cards inserted into pocket 19, the jar 24 filled with distilled water, and a syringe and hydrometer inserted into the apertures 27 and 37, respectively.

Upon receiving a call to service a storage battery, the kit is ready for the mechanic who carries it to the place where the battery is to be serviced. All of the tools necessary for the work are immediately available to the mechanic. Distilled water may be added to the storage battery by using the syringe and the specific gravity of the water and acid in the battery determined by using the hydrometer.

It is pointed out that my battery servicing kit is particularly well adapted for use around a gasoline station or the like by the station attendants while servicing the batteries in the cars of their customers.

I claim:

1. In a battery servicing kit, a compartment having a closed bottom, a liquid-holding jar disposed therein with the tops of the compartment and the jar arranged in registry, the bottom of the jar being supported on said closed bottom, the outer dimensions of the jar conforming to the inner dimensions of the compartment, and an apertured cover removably secured to the compartment and serving as a lid over the jar.

2. In a battery servicing kit, a compartment, a liquid-holding jar disposed therein with the tops of the compartment and the jar arranged in registry, the outer dimensions of the jar conforming to the inner dimensions of the compartment, and an apertured cover secured to the compartment and serving as a lid over the jar, the cover having a stepped marginal edge defining a projection extending downwardly into the jar and in contact with the jar walls.

3. In a battery servicing kit, a cover having an aperture therein, the aperture being reduced at one end thereof to define an inwardly-extending flange, and a yielding collar having an external groove engaging with the flange, the collar having an opening extending therethrough and serving as a seat for liquid-holding instrument.

4. In a battery servicing kit, an elongated box-like structure having a central compartment and wing compartments arranged on two opposing sides of the central compartment, and a loop-shaped handle having the ends thereof swingably fastened to said opposing sides of the central compartment, the handle being free to swing laterally relative to the central compartment and being disposed along the central vertical plane of the elongated box-like structure, whereby unbalacing of the wing compartments with respect to each other will not cause the box-like structure to swing relative to the handle when the latter is lifted.

5. In a battery servicing kit, an elongated box-like structure having a liquid-holding compartment, a cover for the compartment having an aperture formed therein offset relative to the central vertical plane of the elongated box-like structure, the aperture being adapted for the introduction of a liquid-holding instrument into liquid in the compartment, and a loop-shaped handle having the ends thereof fastened to two opposing walls of the compartment along said central vertical plane, whereby the instrument may be withdrawn from the aperture while the handle remains upright.

6. In a battery servicing kit, an elongated box-like structure having a central compartment and wing compartments arranged on two opposing sides of the central compartment, and a loop-shaped handle having the ends thereof swingably fastened to said opposing sides of the central compartment, the handle being free to swing laterally relative to the central compartment and being disposed along the central vertical plane of the elongated box-like structure, the handle being swingable into substantially horizontal position to present its hand-gripping portion beyond the box-like structure, the upper edges of the wing compartments serving as limiting stops when the handle is moved into said substantially horizontal position.

FRANK B. SCHMITT.